United States Patent [19]
Hochart

[11] 3,853,526
[45] Dec. 10, 1974

[54] HIGH TEMPERATURE ROLLER WITH HIGH SILICA FABRIC SLEEVE

[75] Inventor: Paul Hochart, La Celle St. Cloud, France

[73] Assignee: Saint-Gobain Industries, Neuilly-sur-Seine, France

[22] Filed: Oct. 13, 1972

[21] Appl. No.: 297,345

Related U.S. Application Data

[62] Division of Ser. No. 549,041, May 10, 1966.

[30] Foreign Application Priority Data
June 24, 1965 France .............................. 65.22102

[52] U.S. Cl. ...................... 65/253, 65/374, 29/132, 193/35 B, 193/37, 198/127 R, 432/236, 432/246
[51] Int. Cl. ............................................ C03b 27/00
[58] Field of Search ............ 65/114, 193, 253, 374; 432/236, 246; 193/35, 35 B, 37; 198/127 R; 29/130, 132

[56] References Cited
UNITED STATES PATENTS
| | | | |
|---|---|---|---|
| 2,326,044 | 8/1943 | Littleton | 65/253 |
| 3,315,774 | 4/1967 | Leflet, Jr. | 432/246 X |

OTHER PUBLICATIONS
Glass Engineering Handbook, by E. B. Shand, 1958 McGraw–Hill Book Co., (pgs. 375, 376).

*Primary Examiner*—Arthur D. Kellogg
*Attorney, Agent, or Firm*—Pennie & Edmonds

[57] ABSTRACT

The invention is directed to the construction of a roller used to convey hot glass sheets and includes the application of a seamless compressible fabric sleeve of silica fibers covering a rigid refractory cylindrical core.

6 Claims, 6 Drawing Figures ers.
HIGH TEMPERATURE ROLLER WITH HIGH SILICA FABRIC SLEEVE This is a division of application Ser. No. 549,041, filed May 10, 1966.

This invention relates to the horizontal tempering of glass, to tempering apparatus, and to novel elements employed therein. It also relates to the transportation of flat objects, having surfaces made soft by heat, without marring the surfaces. As the invention is of particular value in the tempering of glass sheet it will be described in its relation to that use.

Because of its high temperature, glass sheet which is about to undergo tempering is difficult to transport because it is difficult to protect the heat-softened surfaces from marring. Present practice requires that the glass sheets be suspended vertically by self-gripping tongs while being heated to softening temperature, which has the disadvantages that the tongs mark the glass and in some cases deform the glass about the gripping points even to the formation of ears at the edge.

To overcome such imperfections it has been proposed to transport the glass horizontally on rollers so spaced, at such speed, that the glass does not sag between them, but that proposal has its own imperfections. The rollers must be free of any surface defect, must not deform at the high temperature employed, and must not adhere to the glass. Even if these difficulties were not enough, it is the experience of the art that the least dust on the roller surface, even dust from the air, will mark the glass. As a result, the horizontal tempering of glass has not been satisfactory except for figured glass in which the figures mask the defects imparted by the rollers; with plate and polished glass the results are not satisfactory.

It is an object of this invention to temper polished glass horizontally without marring its surface, to provide apparatus therefor, to transport materials of soft surface horizontally at elevated temperature without damage to the surface, and to provide novel machines and machine elements for these purposes.

The objects of the invention are accomplished, generally speaking, by apparatus for transporting flat sheet with soft surfaces without marring the surfaces comprising a series of driven rollers having their outer surfaces composed of compressible layers of inorganic fibers which are inert at the working temperatures of the process, by a method of tempering glass sheet horizontally which comprises resting the sheet on driven inert rollers having compressible fibrous surfaces, heating the sheet to its softening temperature as it moves over the rollers, rapidly chilling the sheet on the rollers and thereby tempering it, and cooling the sheet to room temperature, and by rollers for the transportation of hot glass sheets at softening temperatures which comprise a rigid, refractory cylindrical core and a seamless surface consisting essentially of a compressible layer of inorganic fibers which do not become dehydrated or degraded at the temperature of use. An important improvement according to this invention consists in using transport rollers which are rigid and indeformable at the softening temperatures of the glass and which have a supple surface of refractory, fibrous material which is not degraded by dehydration nor chemically decomposed at working temperatures. Such a surface can be provided by covering a layer of even thickness which is free of seams capable of marking the glass. Asbestos is not useful as it dehydrates at about 700°C., loses a large part of its strength, and ultimately disintegrates. The fibers used are refractory, do not melt at working temperatures, do not adhere to the glass. Silica fibers, for instance those made by fibering molten silica and silicious fibers of glass from which the alkali metals have been removed give excellent results. The refractory layer of compressible fibers which covers the roller may be composed of pleated fabrics, knitted fabrics or woven fabrics, for example, which may be made in the form of sleeves to be drawn over the rollers or as strips to be helically applied to the outside of the rollers to form what is essentially a seamless covering, seamless at least to the extent that the helical seams do not mar the surface of the glass. In general, pleated and knitted fabrics are preferred because they have longer life, without however excluding woven fabrics. The fabrics are applied to the rollers so as to form a seamless layer in the sense that it is of uniform thickness and lacks gaps. This result can be obtained by wrapping the roller helically with strips but it is better both as to results and to ease of application, to cover the rollers with a seamless tubular fabric. Furthermore, such a fabric can be brought into tight circumferential engagement with the surface of the roller by pulling its extremities. The thickness of the layer may vary within large limits depending upon the use which is contemplated, the temperature, the diameter of the roller, the thickness of the glass and its weight. Excellent results have been obtained for polished glass plates of 8 to 10 mm. thickness by using a pleated tube having a thickness of about 1 mm. This satisfactory result was brought on a machine having supporting rollers which were spaced apart by the distances which are commonly used.

It is believed that the absence of marks on the surface of the glass which passes over the novel rollers is derived in part from the greater supporting surface provided by the compressible layer. Compared to the hard, smooth surfaced rollers heretofore used, the rollers of this invention provide a wider area of support, an area several tens of times as great as the linear support provided by a hard roller. The pressure exerted by a glass plate on the rollers is sufficient to compress the fibers and provide this broader surface. Furthermore, the fibrous surface absorbs the minute grains of dust and foreign bodies in its thickness and prevents them from being pressed into the surface of the glass.

The apparatus of this invention can be used in all situations where glass is transported horizontally at a temperature which softens its surface without deforming or marking the glass. This discovery is particularly valuable in processes of tempering and of annealing glass sheets. The following examples illustrate the invention without detracting from the generality of what is elsewhere herein stated.

EXAMPLE 1

This example describes an apparatus for tempering polished glass of a thickness from 8 to 10 mm. in which there are rollers covered with a tubular layer of pleated silica fibers to support the glass sheets passing through the reheating furnace and the tempering zone.

Figure 1:
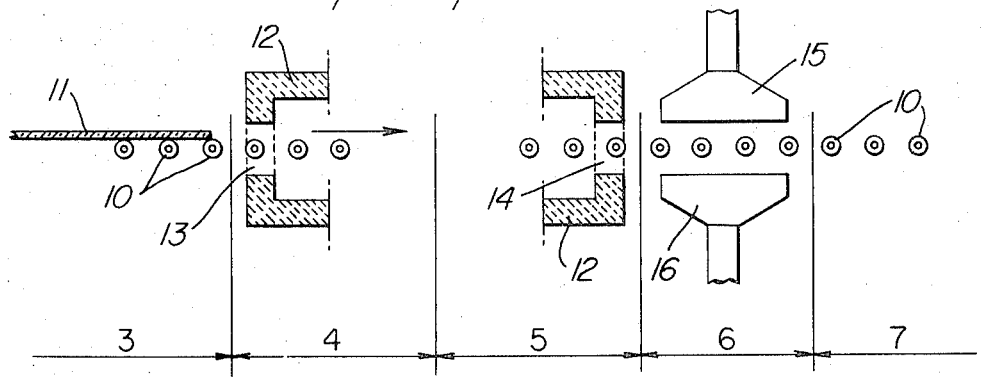
FIG. 1 represents this apparatus schematically in partial vertical section.

In FIG. 1 rollers 10 receive a polished glass plate 11 and transport it into a tunnel furnace 12 interiorly provided with heating means. The rollers are all driven at the same peripheral speed which is adjusted to the length of the surface and the intensity of the heat delivered to the glass. The glass enters the furnace through a slit 13, is heated to softening temperature, and leaves the furnace through slit 14, passing immediately between the blowers 15,16 which deliver volumes of cool air to the opposite sides of the plate, chilling it rapidly and tempering it. From the blowers the glass, in a partly cooled condition, passes through a station where it can be removed and stacked for final cooling to room temperature. The diameter of the rollers is 120 mm. The rollers outside opening 13 need not have any particular construction, although danger of marring will be reduced by using the rollers of this invention. They may be constructed, for example, of cylindrical metallic cores covered with sleeves of asbestine. In the region 4 of the furnace the rollers are spaced about 250 mm. apart. In the zone 5 they are about 150 mm. apart, the distance being measured between axes. These rollers are preferably hollow silica rollers covered with a layer of silica fibers.

Figure 2:
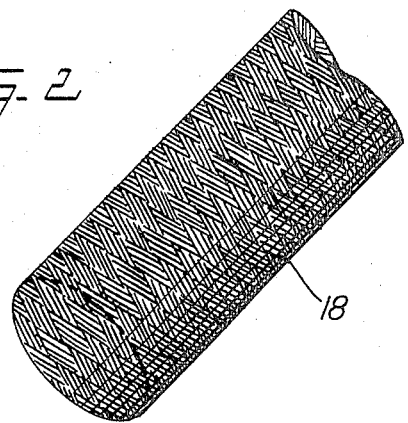
FIG. 2 illustrates the tubular sleeve which furnishes the surface of the roller.
Figure 3:
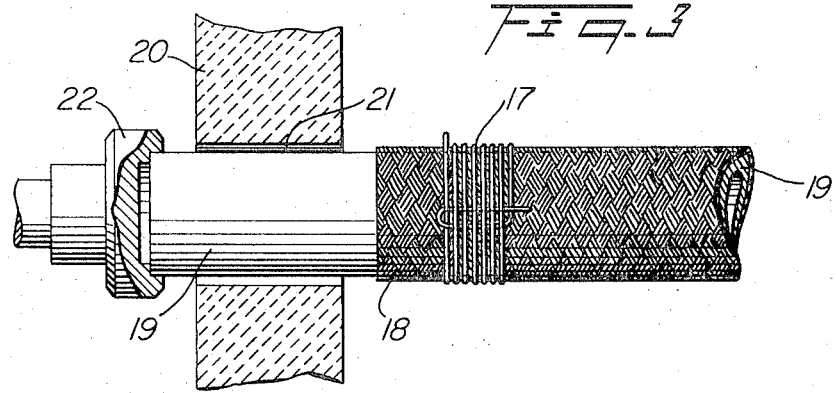
FIG. 3 is a partial vertical section illustrating the support of the roller and the attachment of the sleeve thereto.
Figure 4:
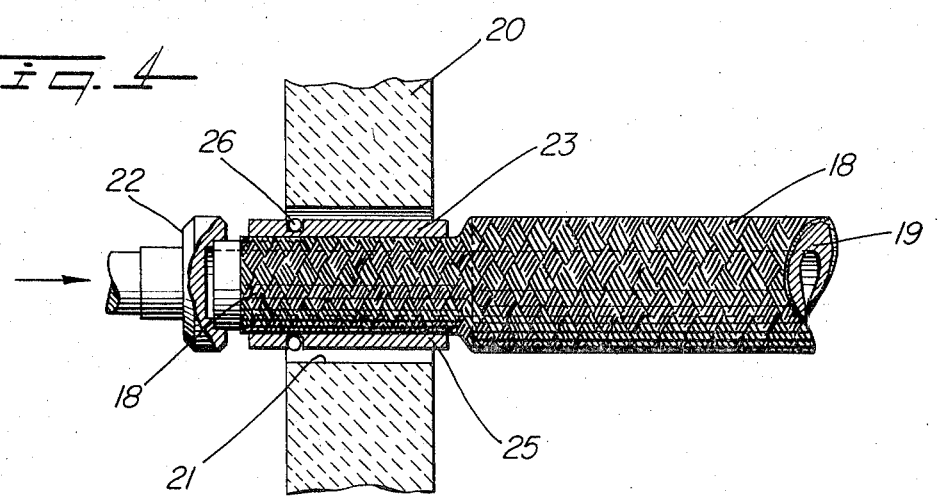
FIG. 4 shows an alternative method of attaching the sleeve.

FIG. 2 represents a part of a tubular sleeve 18 of the type of this invention. It is pleated, has neither warp nor woof and is composed of fibrous elements which are interlaced in the longitudinal direction. It has 124 threads each of 10 ends comprising 960 elemental fibers of silica of a diameter of 9 microns. The tube is drawn onto the roller and lashed at its two extremities so that it is tight to the surface of the roller. The attachment of the tube to the roller may be made in different ways depending upon whether the ends of the tube are to be inside the furnace or outside. In FIG. 3 the tube is shown to be attached by a whipping, a silica strand 17 being used. In FIGS. 3 and 4 the silica roller 19 projects through an aperture 21 in the wall 20 of the furnace. The ends of the roller are supported by rotary supports 22, one of which will be driven by any convenient means. The attachment of the sleeve of the roller to the core of the roller outside of the furnace does not show any substantial problem particularly because of the low temperature in that region. A whipping by materials resistant to temperatures of 50°–150° is adequate whether or not the apertures 21 are covered by refractory caps. A cord of glass fibers is satisfactory. It is also possible to attach the sleeve to the roller by silicate threads.

The attachment of the sleeve to the core outside of the furnace presupposes the free passage of the sleeve through the wall of the furnace which allows a certain space between the wall of the orifice and the outer surface of the roller. If it is desired to limit the loss of heat to a minimum the extremities of the tube will be lashed to the sleeve inside the furnace. This can be obtained by the use of a cord or ribbon having a resistance to temperatures of 700°–800°C. Cord composed of 3840 silica fibers may be used for this purpose. The use of silicate cord inside the furnace is to be avoided because it may entrain an attack on the silica roller.

Figure 5:
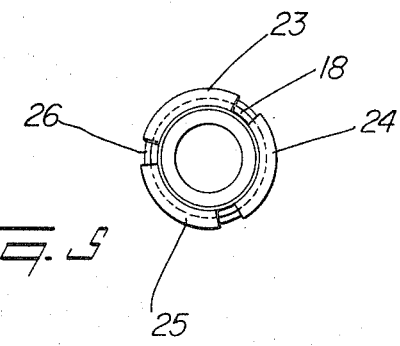
FIG. 5 is a vertical elevation of a clamping ring attached to hold the sleeve on the roller.

In FIG. 4 the tube is attached outside the furnace. The tube is pressed against the core by a silica ferrule formed in three sectors 23, 24 and 25 which are pressed tight against the roller by a steel spring 26. In FIG. 4, the roller 19 has an end portion of reduced diameter which passes through the wall of the furnace. It is gripped in that region by a silica ferrule of the type described above and shown in FIG. 5.

Figure 6:
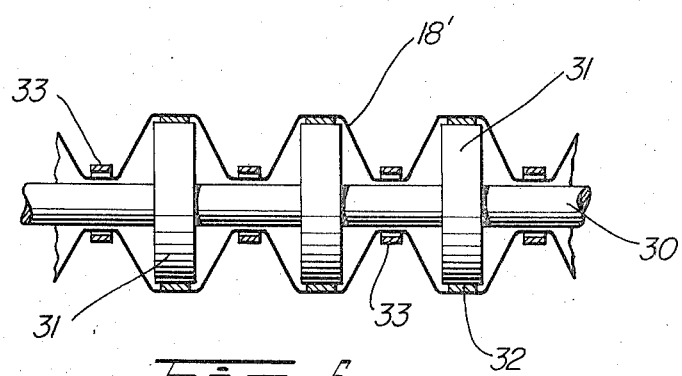
FIG. 6 is a vertical elevation of a modified form of roller.

The downstream rollers, for example those in the tempering zone 6 of FIG. 1, need not be cylindrical as those found inside the furnace but may be constructed as in FIG. 6 of metal shafts 30 upon which wheels 31 having tires 32 of asbestine are mounted at intervals. This arrangement permits a better circulation of cooling air and a ready path of escape for fragments in case of breakage. These rollers are covered with a tube 18' of silica fibers similar to that used on the rollers inside the furnace. As the temperature in this region is relatively low there is no problem in attaching the sleeve to the wheels and the shaft. For the same reason, the sleeve may be composed of glass fibers in this region of low temperature. As shown in FIG. 6, the tube is clamped to the shaft 30 between the wheels 31 by means of spring clips or ligatures diagrammatically illustrated at 33. The rollers in region 7 of FIG. 1 can be of any sort as the glass surface has been hardened between the blowers.

The furnace may be heated by electrical resistances, radiant burners or the like and the temperature within the furnace may be on the order of 740°C near the entry port, about 800° in the middle of the furnace and about 740° near the port of discharge. As they leave the furnace, the temperature of the sheets may be on the order of 630°C. Under these conditions, the glass may move through the furnace and the tempering zone at a speed of about 2 cm. per second, the length of the furnace being such that the sojourn of the glass therein will be about 6 minutes, 15 seconds.

In order to reduce heat loss it is advisable to close the ends of the rollers, for which purpose stoppers of refractory fibers, for example of aluminum, may be used.

EXAMPLE 2

When it is desired to temper thinner glass than is described in Example 1, it is advisable to reduce the space between the rollers within the furnace and/or to increase the speed of the glass therein. By such means it is possible to temper glass having a thickness of 5 to 6 mm. using the same furnace but with rollers having an exterior diameter of its silica fiber layer of 60 mm., the distance between the axes of the rollers being about 80 mm. The sheets may travel through the furnace at about 10 cm. per second and have a time of residence of about 3 minutes.

The advantages of this invention are substantial: The invention makes it possible to temper glass sheet horizontally on rollers without marring the surface of the glass. The invention eliminates the marring of the glass by dust and fine particles carried by the air in the tempering room. The glass is carried on broader and softer surfaces and is protected against minute shocks derived from the apparatus or from the building on which it rests. The silica surface does not adhere to the glass at the temperatures involved and the plate does not pick up minute attachments from it. The tempering is carried out under standard conditions with standard blowers but the result is far superior to what was previously achieved in horizontal tempering because of the improved condition of the surface of the product.

As many apparently widely different embodiments of the present invention may be made without departing from the spirit and scope thereof, it is to be understood that the invention is not limited to the specific embodiments.

What is claimed is:

1. A roller for the transportation of hot glass sheets at softening temperatures which comprises a rigid, refractory cylindrical core and a seamless surface consisting essentially of a compressible fabric sleeve that consists essentially of silica fibers which do not become dehydrated or degraded at the temperature of use.

2. A roller for transporting hot glass comprising an axle, wheels thereon spaced therealong, a seamless, inert, inorganic sleeve covering the wheels, and clamping means fastening the sleeve to the axle between the wheels.

3. A roller according to claim 2 in which the wheels have fibrous, refractory tires beneath the sleeve.

4. A roller for the transportation of hot glass sheets at softening temperatures which comprises a rigid, cylindrical core of silica and a seamless, compressible fabric sleeve of silica.

5. A roller according to claim 4 in which the silica sleeve is composed of braided strands of silica.

6. A roller for the transportation of hot glass sheets at softening temperatures which comprises a rigid, refractory cylindrical core and a seamless outer surface comprising a seamless fabric sleeve consisting essentially of a compressible layer of silica fibers.

* * * * *